United States Patent
Lainema

(10) Patent No.: US 7,379,501 B2
(45) Date of Patent: May 27, 2008

(54) DIFFERENTIAL CODING OF INTERPOLATION FILTERS

(75) Inventor: Jani Lainema, Irving, TX (US)

(73) Assignee: Nokia Corporation, Espoo (FI)

( * ) Notice: Subject to any disclaimer, the term of this patent is extended or adjusted under 35 U.S.C. 154(b) by 711 days.

(21) Appl. No.: 10/342,439

(22) Filed: Jan. 14, 2003

(65) Prior Publication Data
US 2003/0169931 A1   Sep. 11, 2003

Related U.S. Application Data

(60) Provisional application No. 60/348,811, filed on Jan. 14, 2002.

(51) Int. Cl.
*H04N 7/12* (2006.01)
(52) U.S. Cl. .................................. 375/240.29
(58) Field of Classification Search ........... 375/240.01, 375/240.26, 240.29; *H04N 7/12*
See application file for complete search history.

(56) References Cited

U.S. PATENT DOCUMENTS

| | | | |
|---|---|---|---|
| 4,901,145 A | 2/1990 | Harradine et al. | 358/105 |
| 6,381,279 B1 | 4/2002 | Taubman | 375/240.18 |
| 6,430,316 B1 | 8/2002 | Wilkinson | 382/236 |
| 6,937,772 B2 * | 8/2005 | Gindele | 375/240.29 |
| 2004/0161035 A1 * | 8/2004 | Wedi | 375/240.01 |

FOREIGN PATENT DOCUMENTS

| | | |
|---|---|---|
| EP | 0 536 784 A2 | 10/1992 |
| EP | 0 536 784 B1 | 1/1998 |
| EP | 0 944 251 A1 | 8/1998 |

* cited by examiner

*Primary Examiner*—Young Lee
(74) *Attorney, Agent, or Firm*—Ware, Fressola, Van Der Sluys and Adolphson, LLP

(57) ABSTRACT

A video coding system for coding a sequence of video frames each having an array of pixel values is provided. The system includes an interpolation filter to reconstruct subpixel values for use in the inter-frame prediction process. The coefficients of an interpolation filter are obtained differentially with respect to a predefined base filter in order to provide a set of difference values. As the base filter coefficients are known to both encoder and decoder and they are statistically close to the actual filters used in the video sequence, the decoder can reconstruct the pixel values based on the set of difference values.

37 Claims, 13 Drawing Sheets

DIFFERENTIAL CODING OF INTERPOLATION FILTERS

This application is based on and claims the benefit of U.S. Provisional Patent Application No. 60/348,811, filed Jan. 14, 2002.

FIELD OF THE INVENTION

The present invention relates to motion compensation in video coding. More specifically, the invention concerns a method for coding the coefficients of interpolation filters used to reconstruct image pixel values in motion compensated video encoders and decoders. The invention also relates to a corresponding video encoder, video decoder and video transmission system that implement the method of the invention.

BACKGROUND OF THE INVENTION

Today there are various video coding standards in existence. These include International Telecommunications Union Telecommunications Standardization Sector (ITU-T) recommendation H.263, and International Standards Organization (ISO) Motion Pictures Expert Group (MPEG) standards MPEG-1, MPEG-2 and MPEG-4. These video coding standards are based on the use of motion compensated prediction and prediction error coding. Motion compensated prediction is performed by analyzing and coding motion between successive frames in a video sequence and reconstructing image blocks using the motion information. The reconstruction of the image blocks is built utilizing motion interpolation filters that are able to generate image (pixel) values for the pixel and sub-pixel positions needed. The basic principles of motion compensated prediction and image reconstruction using interpolation filters is described in greater detail in the following paragraphs.

Digital video sequences, like ordinary motion pictures recorded on film, comprise a sequence of still images, often referred to as "frames". The illusion of motion is created by displaying the frames one after the other at a relatively fast rate, typically 15 to 30 frames per second. Because of the relatively fast frame rate, the image content of consecutive frames tends to be quite similar, and thus consecutive frames contain a considerable amount of redundant information.

Each frame of a digital video sequence comprises an array of image pixels. In a commonly used digital video format, known as the Quarter Common Interchange Format (QCIF), a frame comprises an array of 176×144 pixels, and thus each frame has 25,344 pixels. Each pixel of the frame is represented by a certain number of bits, which carry information about the luminance and/or color content (chrominance) of the region of the image corresponding to the pixel. Commonly, a so-called YUV color model is used to represent the luminance and chrominance content of an image. The luminance, or Y, component represents the intensity (brightness) of the image, while the color content of the image is represented by two chrominance components, labelled U and V.

Color models based on a luminance/chrominance representation of image content provide certain advantages compared with colour models that are based on a representation involving primary colours (that is Red, Green and Blue, RGB). Because the human visual system is more sensitive to intensity variations than it is to color variations, YUV color models exploit this property by using a lower spatial resolution for the chrominance components (U, V) than for the luminance component (Y). In this way, the amount of information needed to code the colour information in an image can be reduced with minor reduction in image quality.

The lower spatial resolution of the chrominance components is usually attained by spatial sub-sampling. Typically, a block of 16×16 image pixels is coded by one block of 16×16 values representing luminance information, and the two chrominance components are each represented by one block of 8×8 values representing an area of the image equivalent to that of the 16×16 array of luminance values. The chrominance components are thus spatially sub-sampled by a factor of 2 in the horizontal and vertical directions. The resulting assembly of one 16×16 luminance block and two 8×8 chrominance blocks is commonly referred to as a YUV macroblock, or macroblock, for short.

A QCIF image comprises 11×9 macroblocks. If the luminance blocks and chrominance blocks are represented with 8 bit resolution (that is by numbers in the range 0 to 255), the total number of bits required per macroblock is (16×16×8)+2×(8×8×8)=3072 bits. Thus, the number of bits needed to represent a video frame in QCIF format, using 8 bit number resolution per component, is 99×3072=304,128 bits. Therefore, the amount of data required to transmit, record or display a video sequence comprising a series of such QCIF format frames at a rate of 30 frames per second is more than 9 Mbps (million bits per second). This data rate is impractical for use in video recording, transmission and display applications because of the very large storage capacity, transmission channel capacity and hardware performance required. For this reason video coding standards, such as those mentioned above, have been developed in order to reduce the amount of information required to represent and transmit video data while retaining an acceptable image quality.

Each of the previously mentioned video coding standards is tailored for application in video recording or transmission systems having different characteristics. For example, the ISO MPEG-1 standard is designed specifically for use in situations where the available data bandwidth is up to about 1.5 Mbits/s. The MPEG-2 video coding standard is primarily applicable to digital storage media and video broadcast and communication with available data bandwidths of up to about 10 Mbits/s. ITU-T recommendation H.263 is intended for use in systems where the available bandwidth is generally much lower. It is particularly suitable for use in situations where video data is to be transmitted in real-time over a fixed line network such as an ISDN (Integrated Services Digital Network) or a conventional PSTN (Public Service Telephone Network), where the available data transmission bandwidth is typically in the order of 64 kbits/s. In mobile videotelephony, where transmission takes place at least in part over a radio communications link, the available bandwidth can be as low as 20 kbits/s.

Although the various video coding standards currently in existence are tailored for use in different situations, the mechanisms they employ in order to reduce the amount of information to be transmitted have many features in common. In particular, they all work in such a way as to reduce the amount of redundant and perceptually irrelevant information in a video sequence to be transmitted. There are basically three types of redundancy in video sequences: spatial, temporal and spectral redundancy. Spatial redundancy is the term used to describe correlation between neighboring pixels within an individual frame of a sequence. Temporal redundancy expresses the fact that the objects appearing in one frame of a sequence are likely to appear in subsequent frames. Spectral redundancy refers to the correlation between different colour components of the same image.

Sufficiently efficient compression cannot usually be achieved by simply reducing the various forms of redundancy in a given sequence of images. Thus, most current video encoders also reduce the quality of those parts of the video sequence which are subjectively the least important. In addition, the redundancy of the compressed video bitstream is itself reduced by means of efficient loss-less encoding. Typically, this is achieved using entropy coding.

Motion compensated prediction is a form of temporal redundancy reduction in which the content of some (often many) frames in a video sequence is "predicted" from other frames in the sequence by tracing the motion of objects or regions of an image between frames. Frames that are compressed using motion compensated prediction are typically referred to as INTER-coded or P-frames, whereas frames that are compressed without using motion compensated prediction are called INTRA-coded or I-frames. A predicted (motion-compensated, INTER-coded) image is rarely precise enough to represent the image content with sufficient quality, and therefore a spatially compressed prediction error (PE) frame is also associated with each INTER frame. Many video compression schemes can also make use of bi-directionally predicted frames, which are commonly referred to as B-pictures or B-frames. B-pictures are inserted between reference or so-called "anchor" picture pairs (I or P frames) and are predicted from either one or both of the anchor pictures.

The different types of frame that occur in a typical compressed video sequence are illustrated in FIG. 3 of the accompanying drawings. As can be seen from the figure, the sequence starts with an INTRA or I frame 30. In FIG. 3, arrows 33 denote the "forward" prediction process by which P-frames 34 are formed. The bi-directional prediction process by which B-frames 36 are formed is denoted by arrows 31$a$ and 31$b$, respectively.

A schematic diagram of a generic video coding system using motion compensated prediction is shown in FIGS. 1 and 2. FIG. 1 illustrates an encoder 10 employing motion compensated prediction and FIG. 2 illustrates a corresponding decoder 20. The encoder 10 shown in FIG. 1 comprises a Motion Field Estimation block 11, a Motion Field Coding block 12, a Motion Compensated Prediction block 13, a Prediction Error Coding block 14, a Prediction Error Decoding block 15, a Multiplexing block 16, a Frame Memory 17, and an adder 19. The decoder 20 comprises a Motion Compensated Prediction block 21, a Prediction Error Decoding block 22, a Demultiplexing block 23 and a Frame Memory 24.

The operating principle of video coders employing motion compensated prediction is to minimize the amount of information in a prediction error frame $E_n(x,y)$, which is the difference between a current frame $I_n(x,y)$ being coded and a prediction frame $P_n(x,y)$. The prediction error frame is thus defined as follows:

$$E_n(x,y)=I_n(x,y)-P_n(x,y). \quad (1)$$

The prediction frame $P_n(x,y)$ is built using pixel values of a reference frame $R_n(x,y)$, which is generally one of the previously coded and transmitted frames, for example, the frame immediately preceding the current frame, and is available from the Frame Memory 17 of the encoder 10. More specifically, the prediction frame $P_n(x,y)$ is constructed by finding "prediction pixels" in the reference frame $R_n(x,y)$ which correspond substantially with pixels in the current frame. Motion information, describing the relationship (e.g. relative location, rotation, scale etc.) between pixels in the current frame and their corresponding prediction pixels in the reference frame is derived and the prediction frame is constructed by moving the prediction pixels according to the motion information. In this way, the prediction frame is constructed as an approximate representation of the current frame, using pixel values in the reference frame. The prediction error frame referred to above therefore represents the difference between the approximate representation of the current frame provided by the prediction frame and the current frame itself. The basic advantage provided by video encoders that use motion compensated prediction arises from the fact that a comparatively compact description of the current frame can be obtained by the motion information required to form its prediction, together with the associated prediction error information in the prediction error frame.

Due to the large number of pixels in a frame, it is generally not efficient to transmit separate motion information for each pixel to the decoder. Instead, in most video coding schemes, the current frame is divided into larger image segments $S_k$, and motion information relating to the segments is transmitted to the decoder. For example, motion information is typically provided for each macroblock of a frame and the same motion information is then used for all pixels within the macroblock. In some video coding standards, such as ITU-T recommendation H.26L, currently under development, a macroblock can be divided into smaller blocks, each smaller block being provided with its own motion information.

The motion information usually takes the form of motion vectors [$\Delta x(x,y), \Delta y(x,y)$]. The pair of numbers $\Delta x(x,y)$ and $\Delta y(x,y)$ represents the horizontal and vertical displacements of a pixel $(x,y)$ in the current frame $I_n(x,y)$ with respect to a pixel in the reference frame $R_n(x,y)$. The motion vectors [$\Delta x(x,y), \Delta y(x,y)$] are calculated in the Motion Field Estimation block 11 and the set of motion vectors of the current frame [$\Delta x(\cdot), \Delta y(\cdot)$] is referred to as the motion vector field.

Typically, the location of a macroblock in a current video frame is specified by the (x,y) co-ordinate of its upper left-hand corner. Thus, in a video coding scheme in which motion information is associated with each macroblock of a frame, each motion vector describes the horizontal and vertical displacement $\Delta x(x,y)$ and $\Delta y(x,y)$ of a pixel representing the upper left-hand corner of a macroblock in the current frame $I_n(x,y)$ with respect to a pixel in the upper left-hand corner of a substantially corresponding block of prediction pixels in the reference frame $R_n(x,y)$ (as shown in FIG. 4$b$).

Motion estimation is a computationally intensive task. Given a reference frame $R_n(x,y)$ and, for example, a square macroblock comprising N×N pixels in a current frame (as shown in FIG. 4$a$), the objective of motion estimation is to find an N×N pixel block in the reference frame that matches the characteristics of the macroblock in the current picture according to some criterion. This criterion can be, for example, a sum of absolute differences (SAD) between the pixels of the macroblock in the current frame and the block of pixels in the reference frame with which it is compared. This process is known generally as "block matching". It should be noted that, in general, the geometry of the block to be matched and that in the reference frame do not have to be the same, as real-world objects can undergo scale changes, as well as rotation and warping. However, in current international video coding standards, such as those referred to above, only a translational motion model is used (see below) and thus fixed rectangular geometry is sufficient.

Ideally, in order to achieve the best chance of finding a match, the whole of the reference frame should be searched. However, this is impractical as it imposes too high a computational burden on the video encoder. Instead, the search region is generally restricted to a region [−p,p] around the original location of the macroblock in the current frame, as shown in FIG. 4c.

In order to reduce further the amount of motion information to be transmitted from the encoder 10 to the decoder 20, the motion vector field is coded in the Motion Field Coding block 12 of the encoder 10, by representing it with a motion model. In this process, the motion vectors of image segments are re-expressed using certain predetermined functions or, in other words, the motion vector field is represented with a model. Almost all currently used motion vector field models are additive motion models, complying with the following general formula:

$$\Delta x(x,y) = \sum_{i=0}^{N-1} a_i f_i(x,y) \quad (2)$$

$$\Delta y(x,y) = \sum_{i=0}^{M-1} b_i g_i(x,y) \quad (3)$$

where $a_i$ and $b_i$ are motion coefficients. The motion coefficients are transmitted to the decoder 20 (information stream 2 in FIGS. 1 and 2). Functions $f_i$ and $g_i$ are motion field basis functions. They are known both to the encoder and decoder. An approximate motion vector field ($\tilde{\Delta}x(x,y)$, $\tilde{\Delta}y(x,y)$) can be constructed using the coefficients and the basis functions. As the basis functions are known to (that is, stored in) both the encoder 10 and the decoder 20, only the motion coefficients need to be transmitted to the encoder, thus reducing the amount of information required to represent the motion information of the frame.

The simplest motion model is the translational motion model which requires only two coefficients to describe the motion vectors of each segment. The values of motion vectors are given by:

$$\Delta x(x,y) = a_0$$

$$\Delta y(x,y) = b_0 \quad (4)$$

This is the model used in ITU-T recommendation H.263 and ISO standards MPEG-1, MPEG-2, MPEG-4 to describe the motion of 16×16 and 8×8 pixel blocks. Systems which use a translational motion model typically perform motion estimation at full pixel resolution or some integer fraction of full pixel resolution, for example at half or one quarter pixel resolution.

The prediction frame $P_n(x,y)$ is constructed in the Motion Compensated Prediction block 13 of the encoder 10, and is given by:

$$P_n(x,y) = R_n[x+\tilde{\Delta}x(x,y), y+\tilde{\Delta}y(x,y)] \quad (5)$$

In the Prediction Error Coding block 14, the prediction error frame $E_n(x,y)$ is typically compressed by representing it as a finite series (transform) of some 2-dimensional functions. For example, a 2-dimensional Discrete Cosine Transform (DCT) can be used. The transform coefficients are quantized and entropy (for example Huffman) coded before they are transmitted to the decoder (information stream 1 in FIGS. 1 and 2). Because of the error introduced by quantization, this operation usually produces some degradation (loss of information) in the prediction error frame $E_n(x,y)$. To compensate for this degradation, the encoder 10 also comprises a Prediction Error Decoding block 15, where a decoded prediction error frame $\tilde{E}_n(x,y)$ is constructed using the transform coefficients. This locally decoded prediction error frame is added to the prediction frame $P_n(x,y)$ by adder 19 and the resulting decoded current frame $\tilde{I}_n(x,y)$ is stored in the Frame Memory 17 for further use as the next reference frame $R_{n+1}(x,y)$.

The information stream 2 carrying information about the motion vectors is combined with information about the prediction error in multiplexer 16 and an information stream 3 containing typically at least those two types of information is sent to the decoder 20.

The operation of a corresponding video decoder 20 will now be described.

The Frame Memory 24 of the decoder 20 stores a previously reconstructed reference frame $R_n(x,y)$. The prediction frame $P_n(x,y)$ is constructed in the Motion Compensated Prediction block 21 of the decoder 20 according to Equation 5, using received motion coefficient information and pixel values of the previously reconstructed reference frame $R_n(x,y)$. The transmitted transform coefficients of the prediction error frame $E_n(x,y)$ are used in the Prediction Error Decoding block 22 to construct the decoded prediction error frame $\tilde{E}_n(x,y)$. The pixels of the decoded current frame $\tilde{I}_n(x,y)$ are then reconstructed by adding the prediction frame $P_n(x,y)$ and the decoded prediction error frame $\tilde{E}_n(x,y)$:

$$\tilde{I}_n(x,y) = P_n(x,y) + \tilde{E}_n(x,y) = R_n[x+\tilde{\Delta}x(x,y), y+\tilde{\Delta}y(x,y)] + \tilde{E}_n(n,y). \quad (6)$$

This decoded current frame may be stored in the Frame Memory 24 as the next reference frame $R_{n+1}(x,y)$.

In the description of motion compensated encoding and decoding of digital video presented above, the motion vector $[\Delta x(x,y), \Delta y(x,y)]$ describing the motion of a macroblock in the current frame with respect to the reference frame $R_n(x,y)$ can point to any of the pixels in the reference frame. This means that motion between frames of a digital video sequence can only be represented at a resolution determined by the image pixels in the frame (so-called full pixel resolution). Real motion, however, has arbitrary precision, and thus the system described above can only provide approximate modelling of the motion between successive frames of a digital video sequence. Typically, modelling of motion between video frames with full pixel resolution is not sufficiently accurate to allow efficient minimization of the prediction error (PE) information associated with each macroblock or frame. Therefore, to enable more accurate modelling of real motion and to help reduce the amount of PE information that must be transmitted from encoder to decoder, many video coding standards allow motion vectors to point "in between" image pixels. In other words, the motion vectors can have "sub-pixel" resolution. Allowing motion vectors to have sub-pixel resolution adds to the complexity of the encoding and decoding operations that must be performed, so it is still advantageous to limit the degree of spatial resolution a motion vector may have. Thus, video coding standards, such as those previously mentioned, typically only allow motion vectors to have full-, half- or quarter-pixel resolution.

Motion estimation with sub-pixel resolution can be implemented as a two-stage process, as illustrated in an exemplary fashion in FIG. 5, for a generic video coding scheme in which motion vectors may have full- or half-pixel resolution. In the first step, a motion vector having full-pixel resolution is determined using an appropriate motion estimation scheme, such as the block-matching process described above. The resulting motion vector, having full-pixel resolution is shown in FIG. 5.

In the second stage, the motion vector determined in the first stage is refined to obtain the desired half-pixel resolution. In the example illustrated in FIG. 5, this is done by forming eight new search blocks of 16×16 pixels, the location of the top-left corner of each block being marked with an X in FIG. 5. These locations are denoted as [Δx+m/2, Δy+n/2], where m and n can take the values −1, 0 and +1, but cannot be zero at the same time. As only the pixel values of original image pixels are known, the values (for example, luminance and/or chrominance values) of the sub-pixels residing at half-pixel locations are estimated for each of the eight new search blocks, using some form of interpolation scheme.

Having interpolated the values of the sub-pixels at half-pixel resolution, each of the eight search blocks is compared with the macroblock whose motion vector is being sought. As in the block matching process performed in order to determine the motion vector with full pixel resolution, the macroblock is compared with each of the eight search blocks according to some criterion, for example a SAD. As a result of the comparisons, a minimum SAD value will generally be obtained. Depending on the nature of the motion in the video sequence, this minimum value may correspond to the location specified by the original motion vector (having full-pixel resolution), or it may correspond to a location having a half-pixel resolution. Thus, it is possible to determine whether a motion vector should point to a full-pixel or sub-pixel location, and if sub-pixel resolution is appropriate, to determine the correct sub-pixel resolution motion vector.

In practice, the estimation of a sub-pixel value in the reference frame is performed by interpolating the value of the sub-pixel from surrounding pixel values. In general, interpolation of a sub-pixel value F(x,y) situated at a non-integer location (x,y)=(n+Δx, m+Δy), can be formulated as a two-dimensional operation, represented mathematically as:

$$F(x,y) = \sum_{k=-K}^{K=1} \sum_{l=-L}^{L=1} f(k+K, l+L) F(n+k, m+l) \qquad (7)$$

where f(k,l) are filter coefficients and n and m are obtained by truncating x and y, respectively, to integer values. Typically, the filter coefficients are dependent on the x and y values and the interpolation filters are usually so-called "separable filters", in which case sub-pixel value F(x,y) can be calculated as follows:

$$F(x,y) = \sum_{k=-K}^{K-1} f(k+K) \sum_{l=-K}^{K-1} f(l+K) F(n+k, m+l) \qquad (8)$$

The motion vectors are calculated in the encoder. Once the corresponding motion coefficients are transmitted to the decoder, it is a straightforward matter to interpolate the required sub-pixels using an interpolation method identical to that used in the encoder. In this way, a frame following a reference frame in the Frame Memory 24, can be reconstructed from the reference frame and the transmitted motion vectors.

Conventionally, the interpolation filters used in video encoders and decoders employ fixed filter coefficient values and the same filter (i.e., the same type of filter with the same filter coefficient values) is used for all frames of a video sequence being coded. The same filter is further used for all video sequences, irrespective of their nature and how they were acquired (captured). Wedi ("Adaptive Interpolation Filter for Motion Compensated Hybrid Video Coding," Picture Coding Symposium (PCS 2001), Seoul, Korea, April 2001), proposes the use of interpolation filters with adaptive filter coefficient values, in order to compensate for certain shortcomings in the video coding process. In particular, Wedi describes how aliasing in the image acquisition process, the finite resolution of allowed motion vectors and the limited validity of the translational motion model introduce additional prediction errors. Aliasing in a video image arises due to the use of non-ideal low-pass filters (and consequent non-fulfilment of the Nyquist Sampling Theorem) in the image acquisition process. Aliasing disturbs motion compensated prediction within the video sequence and gives rise to an additional prediction error component. The finite precision of the allowed motion vectors (e.g., full-pixel, one-half pixel, or one-quarter pixel) and the ability of the translational motion model to represent only horizontal and vertical translational movement between successive video frames also give rise to additional prediction error contributions. Wedi further proposes that an improvement in coding efficiency can be achieved by adapting the filter coefficient values of an interpolation filter to compensate for the additional prediction errors introduced by aliasing, finite motion vector precision and limited validity of the translational motion model.

More generally, it should be appreciated that since the nature and characteristics of the motion varies in a video sequence, the optimal interpolation filter varies as a function of time and image location. Wedi presents an example in which an interpolation filter with dynamically adaptive filter coefficient values is integrated into the H.26L video codec, more specifically, the version of that codec defined by Test Model (TML) 4. TML-4 of H.26L used a one-quarter-pixel motion vector resolution and a Wiener-type interpolation filter with six symmetric filter coefficients (6-tap filter). The example presented in Wedi proposes adapting the filter coefficients of the interpolation filter on a frame-by-frame basis, differentially coding the filter coefficients and transmitting them to the decoder as side information to the main video data. A proposal based on this approach was made to include the use of interpolation filters with dynamically adaptive filter coefficient values in Test Model 8 of the H.26L video codec. This is presented in the ITU—Telecommunications Standardization Sector entitled: "Adaptive Interpolation Filter for H.26L" Study Group 16, Question 6, Video Coding Experts Group (VCEG), document VCEG-N28 September 2001 and "More Results on Adaptive Interpolation Filter for H.26L" Study Group 16, Question 6, Video Coding Experts Group (VCEG), document VCEG-016r1, November 2001.

The use of dynamically adaptive interpolation filters raises an important issue relating to the coding efficiency of the encoded video data stream and also has an effect on the error resilience of the encoded video data. The issue of coding efficiency can be understood in a straightforward manner. In a video coding system that employs an interpolation filter having fixed filter coefficient values, there is no need to include any information relating to the filter coefficient values in the encoded video data bit-stream. The filter coefficient values can simply be recorded in the video encoder and video decoder. In other words, in a video coding system implemented according to a particular video coding standard that employs fixed interpolation filters, the coefficient values are pre-programmed into both encoder and decoder according to the specifications of the standard. However, if dynamically adaptive filter coefficients are allowed, it becomes necessary to transmit information relating to the coefficient values. As the filter coefficients are periodically updated (e.g. on a frame-by-frame basis), this necessarily adds to the amount of information to be sent from the video encoder to the decoder and has a deleterious effect on coding efficiency. In low bit-rate video coding applications, any increase in the amount of information to be transmitted is generally undesirable.

Thus, in order to optimally model and compensate motion, an efficient representation of the dynamic interpolation filters is needed.

Regarding error resilience, it should be appreciated that the way in which information about the coefficients of a dynamically variable interpolation filter is transmitted from encoder to decoder may affect the susceptibility of the video data to transmission errors. More specifically, in a video coding system that employs dynamically adaptive interpolation filters, correct reconstruction of a frame of a video sequence at the decoder is reliant on correct reception and decoding of the filter coefficient values. If the information relating to the coefficient values is subject to error during its transmission from encoder to decoder, corruption of the reconstructed video data is likely. There are three ways of coding the filter coefficients known from prior art. The first is to entropy code the filter coefficient values separately. The second is to entropy code the filter coefficient values differentially with respect to filter coefficients of already decoded filters (as proposed in Wedi) and the third is to define a set of filters and code the index of the selected filter.

The prior art solutions that could be used for coding interpolation filter coefficients, as mentioned above, all have problems associated with them in different usage scenarios. The first method, in which the interpolation filter coefficients are coded separately offers inferior coding performance, since it does not utilise any a priori information (i.e., information about previously coded interpolation filter coefficient values). This approach therefore requires an unduly large amount of information to be added to the encoded video bit-stream in order to describe the interpolation filter coefficient values. Differential coding of the coefficients, as proposed in Wedi, is efficient, but may not be used in an environment with possible transmission errors, since the filter coefficients depend on correct decoding of earlier filter coefficients. As previously described, if the encoded video bit-stream is subject to error during its transmission from encoder to decoder, corruption of the video data reconstructed at the decoder is likely to occur. The third prior art solution with a predefined set of filters provides only limited alternatives and thus degrades the coding performance. In other words, this option cannot achieve the full advantages of using interpolation filters with dynamically adaptive filter coefficient values, as set out in Wedi.

Thus, it should be appreciated that there is a need for a method of coding the coefficient values of adaptive interpolation filters that is both efficient and does not lead to deterioration in the error resilience of the encoded video bit-stream.

SUMMARY OF THE INVENTION

The present invention combines the good coding efficiency of differential coding with error resilient features allowing it to be used in all environments. It is therefore particularly suited for implementation in a video coding system for use in error prone environments, for example where an encoded video bit-stream is to be transmitted over a radio communications link subject to interference.

Thus, according to the first aspect of the present invention, there is provided a method of encoding images in a digital video sequence for providing encoded video data, wherein the digital video sequence comprises a sequence of video frames, each frame having a plurality of pixel values, and wherein an interpolation filter having a plurality of coefficients represented by a plurality of coefficient values is used for reconstructing the pixel values in a frame of said digital video sequence from the encoded video data. The method is characterized by coding the coefficient values of the interpolation filter differentially with respect to a predefined base filter to form a set of difference values, and adapting said set of difference values in the encoded video data so that the reconstruction of the pixel values is based on said set of difference values.

Advantageously, the encoded video data including encoded values indicative of said set of difference values, and said set of difference values is entropy coded before being transmitted from the video encoder to the video decoder.

Advantageously, the predefined base filter has a plurality of coefficients having values statistically similar to the coefficient values of the interpolation filter.

Advantageously, the coefficients of the interpolation filter are selected for interpolation of pixel values in a selected image segment.

Advantageously, the predefined base filter has fixed coefficient values.

Advantageously, the predefined base filter has a plurality of coefficients adapted to the statistics of the video sequence.

Preferably, the interpolation filter is symmetrical such that only half the filter coefficients are coded.

Advantageously, the coefficient values of the interpolation filter are coded in a certain order, from a first coefficient value to a last coefficient value, and the certain order is different from the spatial order of said coefficients.

Advantageously, the sum of the coefficient values of the interpolation filter is fixed.

Advantageously, the predefined base filter has a plurality of coefficient values, and a constant value is added to the coefficient values of the predefined base filter so as to reduce the amplitude of differences between the coefficient values of the interpolation filter and the coefficient values of the predefined base filter.

According to the second aspect of the present invention, there is provided a video encoder, which comprises:

means for encoding images in a digital video sequence having a sequence of video frames for providing encoded video data indicative of the video sequence, each frame of the video sequence comprising a plurality of pixel values, and means for defining an interpolation filter for reconstructing the pixel values in a frame of said digital video sequence in a decoding process, wherein the interpolation filter has a number of coefficients represented by a plurality of coefficient values. The video encoder is characterized by means, responsive to the interpolation filter, for computing a difference between the coefficient values of said interpolation filter and a predefined base filter for providing a set of difference values, and means for adapting said set of difference values in the encoded video data so that the reconstruction of the pixel values in the decoding process is based on said set of difference values.

Advantageously, the encoder comprises means for entropy coding said set of difference values before adapting said set of difference values in the encoded video data.

According to the third aspect of the present invention, there is provided a method of decoding video data indicative of a digital video sequence comprising a sequence of video frames, each frame of the video sequence comprising a plurality of pixel values, wherein an interpolation filter having a plurality of coefficients represented by a plurality of coefficient values is used for reconstructing the pixel values in a frame of said digital video sequence. The method is characterized by retrieving from the video data a set of difference values, said set of difference values indicative of a difference between the coefficient values of the interpolation filter and a predefined base filter;

constructing a further filter based on said set of difference values and the predefined base filter; and reconstructing of the pixel values based on the further filter.

Advantageously, the predefined base filter has a plurality of coefficients represented by a plurality of coefficient values, and the construction of further filter is carried out by summing said set of difference values with the coefficient values of the predefined base filter.

Advantageously, said set of difference values is retrieved from the video data by entropy decoding.

According to the fourth aspect of the present invention, there is provided a video decoder, which comprises means for receiving video data in a bit-stream, the received video data indicative of a digital video sequence comprising a sequence of video frames, each frame of the video sequence comprising a plurality of pixel values. The video decoder is characterized by:

means for retrieving a set of difference values from the bit-stream;

means for constructing an interpolation filter based on a predefined base filter and said set of difference values; and means for reconstructing the pixel values in a frame of the video sequence based on the interpolation filter and the received video data.

Advantageously, the video decoder also has means for summing said set of difference values with the further coefficient values of the predefined base filter for constructing the interpolation filter, and means for entropy decoding said set of difference values from the bit-stream.

According to the fifth aspect of the present invention, there is provided by a video coding system, which comprises:

an encoder for encoding images in a digital video sequence having a sequence of video frames for providing encoded video data in a bit-stream indicative of the video sequence, each frame of the video sequence comprising a plurality of pixel values, the encoder having means for defining an interpolation filter for reconstructing the pixel values in a frame of said digital video sequence in a decoding process, wherein the interpolation filter has a plurality of filter coefficients represented by a plurality of coefficients values, and a decoder for receiving the encoded video data in the bit-stream for reconstructing the pixel values in a frame of the video sequence in the decoding process. The video coding system is characterized in that the encoder further comprises:

means for computing a difference between to the interpolation filter and a predefined base filter for providing a set of difference values, and means for adapting said set of difference values in the bit-stream; and that the decoding comprises:

means for retrieving from the bit-stream said set of difference values; and means for constructing a further filter based on the predefined base filter and the retrieved set of difference value so that the reconstruction of the pixel values in the decoding process is based on the further filter.

These and other features of the present invention will become apparent with reference to the following description in conjunction with the accompanying drawings. It is to be understood, however, that the drawings are designed solely for the purposes of illustration and not as a definition of the limits of the invention.

BEST MODE TO CARRY OUT THE INVENTION

Figure 6A:
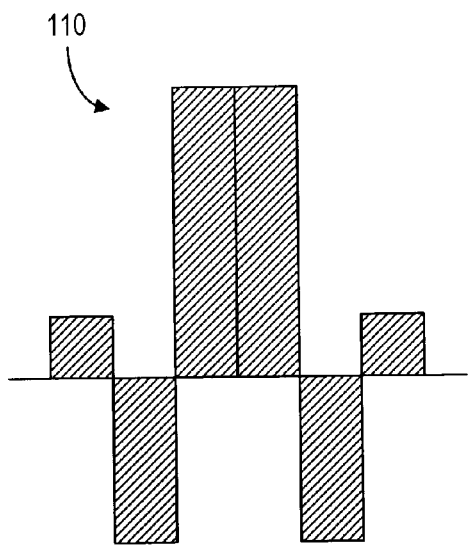
FIG. 6a is a schematic representation illustrating an optimum interpolation filter.
Figure 6B:
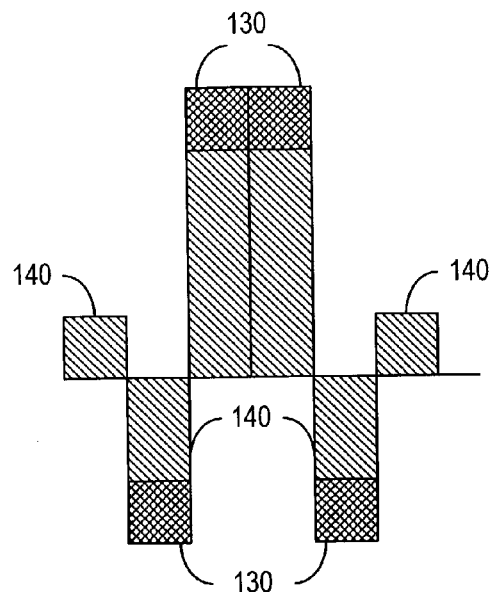
FIG. 6b is a schematic representation illustrating the optimum interpolation being decomposed into the base filter and the difference coefficients.
Figure 6C:
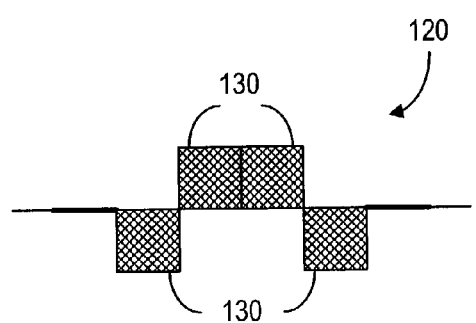
FIG. 6c is a schematic representation illustrating the difference coefficients to be coded and sent to the decoder.

The encoder, according to the present invention, codes filter coefficients differentially with respect to predefined base filter coefficients. FIGS. 6a-6c illustrate the method according to the present invention. The bar graphs presented in FIG. 6a are representative of interpolation filter coefficient values, each bar corresponding to one of the filter coefficients. The height of a bar represents the respective coefficient value, bars extending above the horizontal axis representing positive coefficient values, bars extending below the horizontal axis, negative coefficient values. Referring to FIG. 6a and FIG. 6b, the bar graph 110 represents the filter that the encoder detects to be best suited for motion interpolation of a selected image segment, while the bar graph 140 represents the base filter. In the example shown in FIG. 6a, the filter is a 6-tap symmetric filter having 6 filter coefficients. Instead of sending the filter coefficients as such, only the differences 130 between the selected filter 110 and the base filter 140 are coded and sent. The sent coefficients 120 are shown in FIG. 6c.

With the present invention, a coding gain is obtained since the small amplitude differences can be coded efficiently with an entropy coder. When such difference values are included in an encoded video bit-stream produced by a video encoder, and the video bit-stream is transmitted from the encoder to a corresponding decoder, the coefficients of the interpolation filter can be reconstructed at the decoder by retrieving the difference values from the encoded bit-stream and adding them to the respective coefficient values of the predefined base filter stored in the decoder.

It should be noted that the base filter can also be adapted to the statistics of the video sequence and received filter coefficients to further improve the coding efficiency. It is also possible that the base filter is predefined for the whole codec. In other words, the same predefined base filter is used for all video sequences to be coded, irrespective of their characteristics, or the way in which they are acquired. Alternatively, the base filter is adapted to the video data, i.e., different base filters are used for different video sequences, or the base filter can be adapted during encoding of a particular video sequence according to certain predefined rules.

If the filter is symmetric, as shown in FIGS. 6a to 6c, only half of the filter coefficients need to be coded. The others can be obtained by copying. In the example presented in FIG. 6c, the amount of information needed to represent the coefficient values of the adaptive interpolation filter in the encoded video bit-stream can be further reduced by realizing that the 4th, 5th and 6th filter coefficients are identical to respectively the 3rd, 2nd and 1st filter coefficients. Thus, in this case, the six coefficients of the interpolation filter can actually be coded by three values, the first representative of the difference between the first interpolation filter coefficient and the first coefficient of the predefined base filter, the second representative of the difference between the second interpolation filter coefficient and the second coefficient of the predefined base filter and the third representative of the difference between the third interpolation filter coefficient and the third coefficient of the predefined base filter. It is then only necessary to include these three difference values in the encoded video bit-stream transmitted from encoder to decoder, as the decoder can obtain the remaining three interpolation filter coefficients by appropriate copying of the first three reconstructed filter coefficient values. A similar approach can be adopted if the base filter and interpolation filter have an odd rather than an even number of coefficients, but are nevertheless symmetrical. In this case, it should be appreciated that the number of difference values to be coded is $(n/2)+1$, where n is the number of coefficients in the base filter/interpolation filter.

The method according to the present invention can also be combined with other coefficient coding methods. For example, a set of most frequently used filters can be defined and coded by their indexes. Less frequently used filters can be coded with the described invention allowing maximum variation to the available filters and thereby overcoming the previously mentioned disadvantage of the third prior art method for coding coefficient values.

The coding order of the filter coefficients does not have to follow the spatial order. For example, the difference values representative of the interpolation filter coefficient values need not be included in the encoded video bit-stream in the same order as the coefficients occur in the filter. In this case a predefined rule specifying the order in which the difference values appear in the bit-stream must be defined and known to both encoder and decoder.

It is possible that the base filter is adapted to the received filter coefficients of the same filter. For example, if the first transmitted filter coefficient is larger than the base filter coefficient, the second base filter coefficient can be decreased. This is especially true if the sum on the filter coefficients is known.

Typically, the sum of the filter coefficients is fixed. In such a case, there is no need to code the last filter coefficient, but it can be calculated by subtracting the sum of the first coefficients from the total sum. If the sum of the filter coefficients is not fixed, a separately transmitted constant or constants can be added to the base filter coefficients or the filter output to reduce the amplitudes of the coefficient differences.

Figure 7:
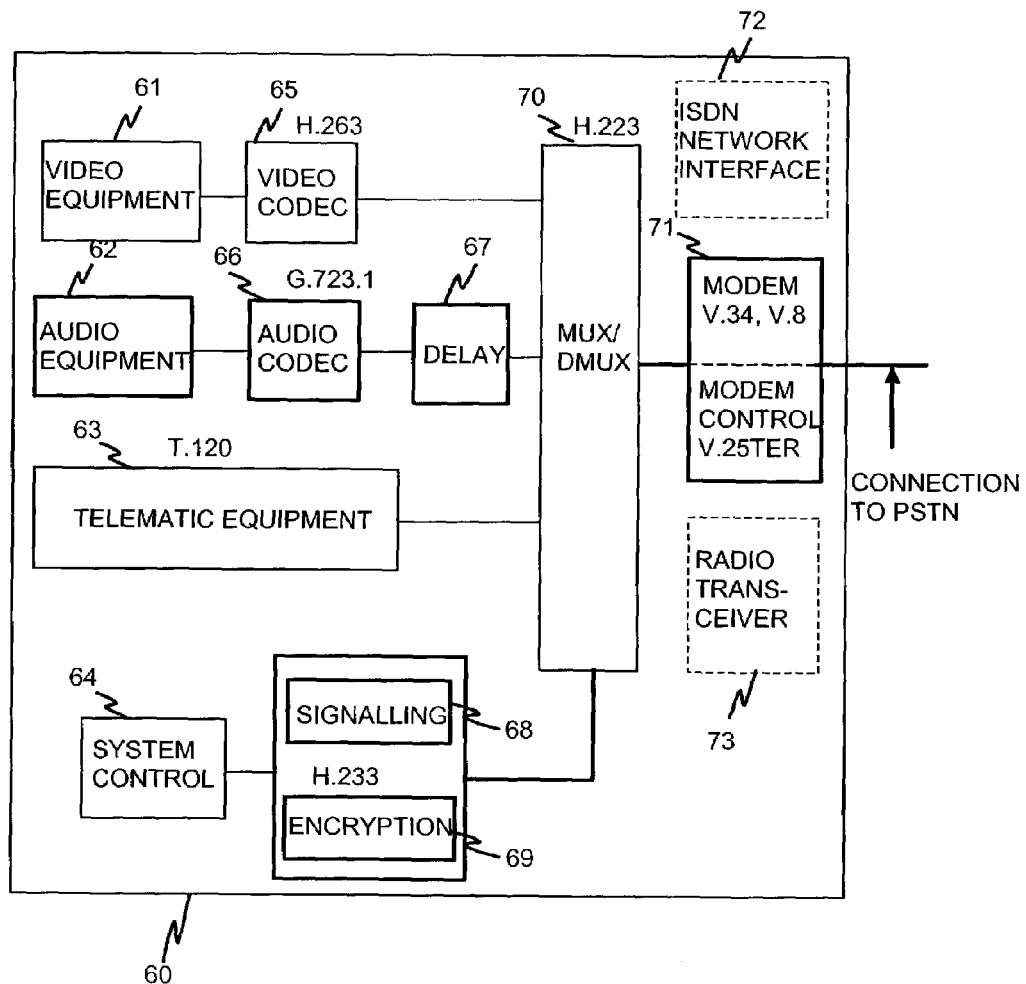
FIG. 7 is a block diagram illustrating a terminal device comprising video encoding and decoding equipment capable of carrying out the present invention.

FIG. 7 presents a terminal device comprising video encoding and decoding equipment that may be adapted to operate in accordance with the present invention. More precisely, FIG. 7 illustrates a multimedia terminal 60 implemented according to ITU-T recommendation H.324. The terminal can be regarded as a multimedia transceiver device. It includes elements that capture, encode and multiplex multimedia data streams for transmission via a communications network, as well as elements that receive, de-multiplex, decode and display received multimedia content. ITU-T recommendation H.324 defines the overall operation of the terminal and refers to other recommendations that govern the operation of its various constituent parts. This kind of multimedia terminal can be used in real-time applications such as conversational videotelephony, or non real-time applications such as the retrieval or streaming of video clips, for example from a multimedia content server in the Internet.

In the context of the present invention, it should be appreciated that the H.324 terminal shown in FIG. 7 is only one of a number of alternative multimedia terminal implementations suited to application of the inventive method. It should also be noted that a number of alternatives exist relating to the location and implementation of the terminal equipment. As illustrated in FIG. 7, the multimedia terminal may be located in communications equipment connected to a fixed line telephone network such as an analogue PSTN (Public Switched Telephone Network). In this case the multimedia terminal is equipped with a modem 71, compliant with ITU-T recommendations V.8, V.34 and optionally V.8bis. Alternatively, the multimedia terminal may be connected to an external modem. The modem enables conversion of the multiplexed digital data and control signals produced by the multimedia terminal into an analogue form suitable for transmission over the PSTN. It further enables the multimedia terminal to receive data and control signals in analogue form from the PSTN and to convert them into a digital data stream that can be demulitplexed and processed in an appropriate manner by the terminal.

An H.324 multimedia terminal may also be implemented in such a way that it can be connected directly to a digital fixed line network, such as an ISDN (Integrated Services Digital Network). In this case the modem 71 is replaced with an ISDN user-network interface. In FIG. 7, this ISDN user-network interface is represented by alternative block 72.

H.324 multimedia terminals may also be adapted for use in mobile communication applications. If used with a wireless communication link, the modem 71 can be replaced with any appropriate wireless interface, as represented by alternative block 73 in FIG. 7. For example, an H.324/M multimedia terminal can include a radio transceiver enabling connection to the current 2nd generation GSM mobile telephone network, or the proposed $3^{rd}$ generation UMTS (Universal Mobile Telephone System).

It should be noted that in multimedia terminals designed for two-way communications, that is for transmission and reception of video data, it is advantageous to provide both a video encoder and video decoder implemented according to the present invention. Such an encoder and decoder pair is often implemented as a single combined functional unit, referred to as a 'codec'.

A typical H.324 multimedia terminal will now be described in further detail with reference to FIG. 7. The multimedia terminal 60 includes a variety of elements referred to as "terminal equipment". This terminal equipment includes video, audio and telematic devices, denoted generically by reference numbers 61, 62 and 63, respectively. The video equipment 61 may include, for example, a video camera for capturing video images, a monitor for displaying received video content and optional video processing equipment. The audio equipment 62 typically includes a microphone, for example for capturing spoken messages, and a loudspeaker for reproducing received audio content. The audio equipment may also include additional audio processing units. The telematic equipment 63, may include a data terminal, keyboard, electronic whiteboard or a still image transceiver, such as a fax unit.

The video equipment 61 is coupled to a video codec 65. The video codec 65 comprises a video encoder and a corresponding video decoder both implemented according to the invention. Such an encoder and a decoder will be described in the following. The video codec 65 is responsible for encoding captured video data in an appropriate form for further transmission over a communications link and decoding compressed video content received from the communications network. In the example illustrated in FIG. 7, it is assumed that the video codec is implemented in such a way as to include the use of dynamically adaptive interpolation filters. It is further assumed that the encoder section of the video codec is adapted to encode and transmit interpolation filter coefficient values to a corresponding decoder according to an embodiment of the inventive method, as previously described. Similarly, the decoder section of the video codec is adapted to receive and decode filter coefficient values encoded according to the same embodiment of the inventive method.

The terminal's audio equipment is coupled to an audio codec, denoted in FIG. 7 by reference number 66. Like the video codec, the audio codec comprises an encoder/decoder pair. It converts audio data captured by the terminal's audio equipment into a form suitable for transmission over the communications link and transforms encoded audio data received from the network back into a form suitable for reproduction, for example on the terminal's loudspeaker. The output of the audio codec is passed to a delay block 67. This compensates for the delays introduced by the video coding process and thus ensures synchronisation of audio and video content.

The system control block 64 of the multimedia terminal controls end-to-network signalling using an appropriate control protocol (signalling block 68) to establish a common mode of operation between a transmitting and a receiving terminal. The signalling block 68 exchanges information about the encoding and decoding capabilities of the transmitting and receiving terminals and can be used to enable the various coding modes of the video encoder. The system control block 64 also controls the use of data encryption. Information regarding the type of encryption to be used in data transmission is passed from encryption block 69 to the multiplexer/demultiplexer (MUX/DMUX unit) 70.

During data transmission from the multimedia terminal, the MUX/DMUX unit 70 combines encoded and synchronised video and audio streams with data input from the telematic equipment 63 and possible control data, to form a single bit-stream. Information concerning the type of data encryption (if any) to be applied to the bit-stream, provided by encryption block 69, is used to select an encryption mode. Correspondingly, when a multiplexed and possibly encrypted multimedia bit-stream is being received, MUX/DMUX unit 70 is responsible for decrypting the bit-stream, dividing it into its constituent media components and passing those components to the appropriate codec(s) and/or terminal equipment for decoding and reproduction.

Figure 1:
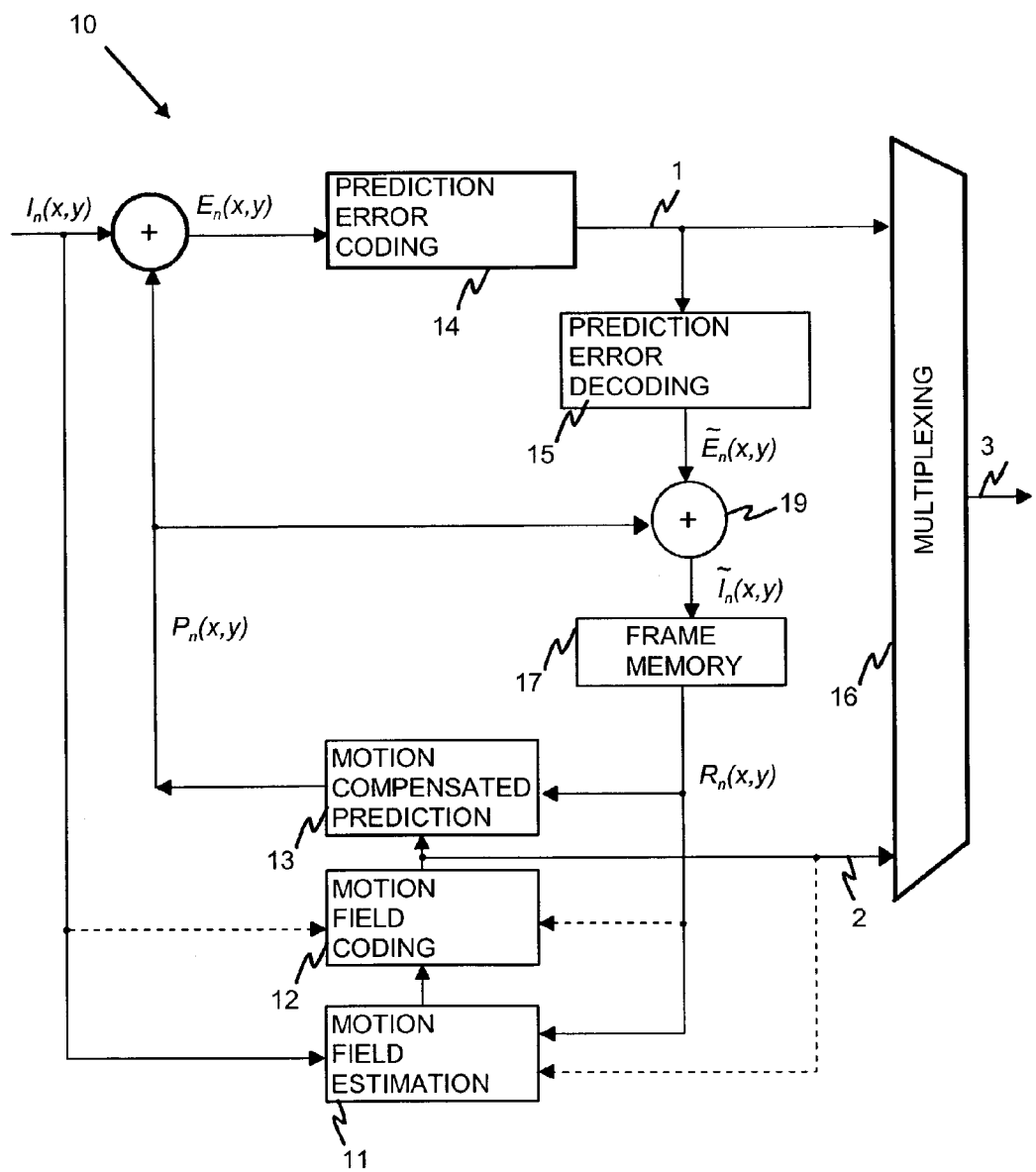
FIG. 1 is a block diagram illustrating a generic video encoder according to prior art.
Figure 8A:
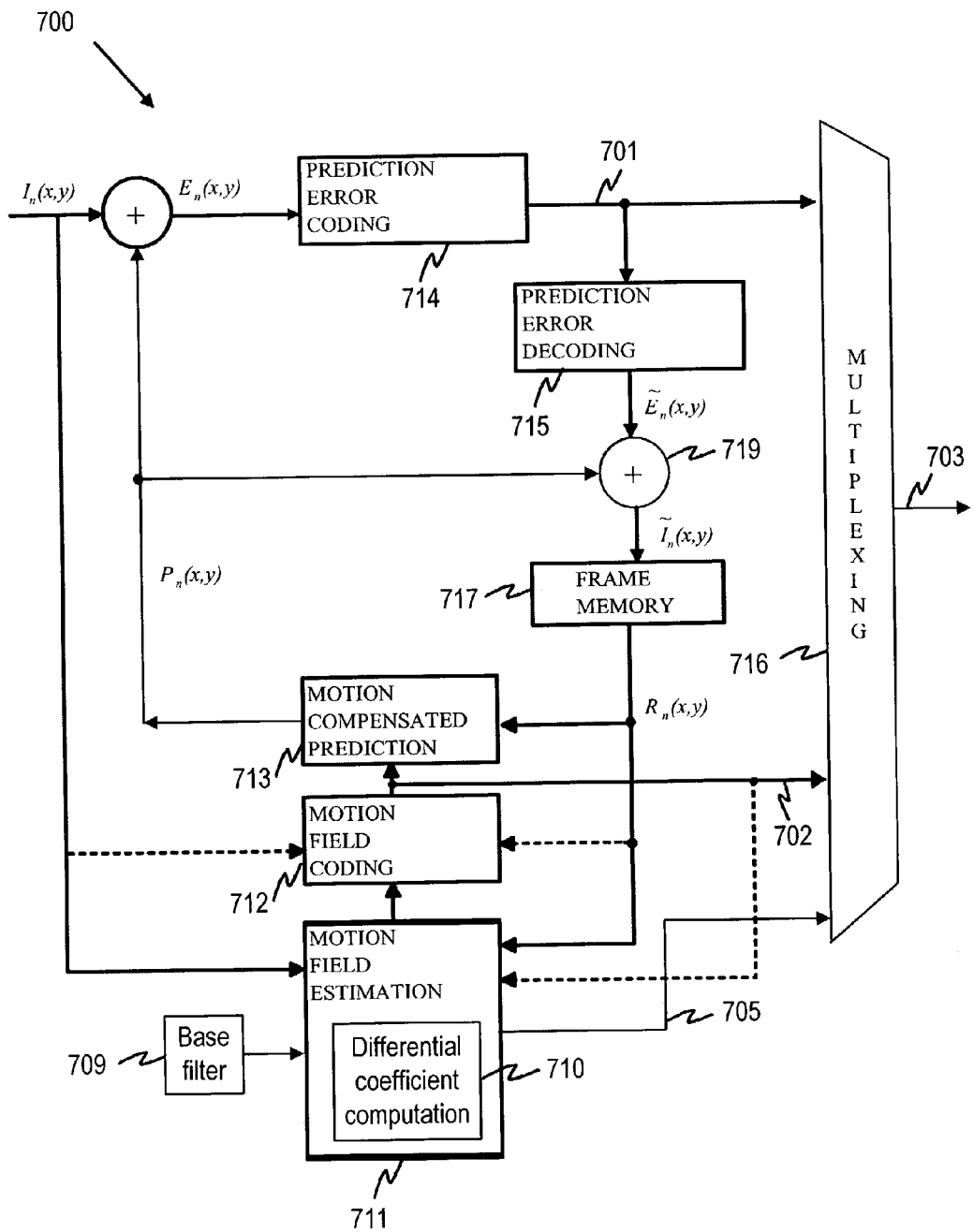
FIG. 8a is a block diagram illustrating a video encoder according to a preferred embodiment of the present invention.

FIG. 8a is a schematic block diagram of a video encoder 700 implemented according to a preferred embodiment of the invention. The structure of the video encoder shown in FIG. 8a is in many respects similar to that of the prior art video encoder illustrated in FIG. 1, with appropriate modifications to those parts of the encoder that perform operations associated with sub-pixel value interpolation and formation of the encoded video bit-stream. Most elements of the video encoder 700 function and operate in a manner similar to the corresponding elements of previously described prior art video encoder 10 (see FIG. 1). Description of such elements is omitted for reasons of conciseness. In particular video encoder 700 comprises a Motion Field Estimation block 711, a Motion Field Coding block 712, a Motion Compensated Prediction block 713, a Prediction Error Coding block 714, a Prediction Error Decoding block 715, a Multiplexing block 716, a Frame Memory 717, and an adder 719. As shown in FIG. 8a, the Motion Field Estimation block 711 also includes a Differential Coefficient Computation block 710, which is used to compute the difference between a selected filter and a base filter 709.

Operation of the video encoder 700 will now be considered in detail. In common with video encoders known from prior art, the video encoder 700 according to this embodiment of the present invention employs motion compensated prediction with respect to a reference frame $R_n(x,y)$ to produce a bit-stream representative of a video frame being coded in INTER format. It performs motion compensated prediction to sub-pixel resolution and further employs an interpolation filter having dynamically variable filter coefficient values in order to form the sub-pixel values required during the motion estimation process.

Figure 5:
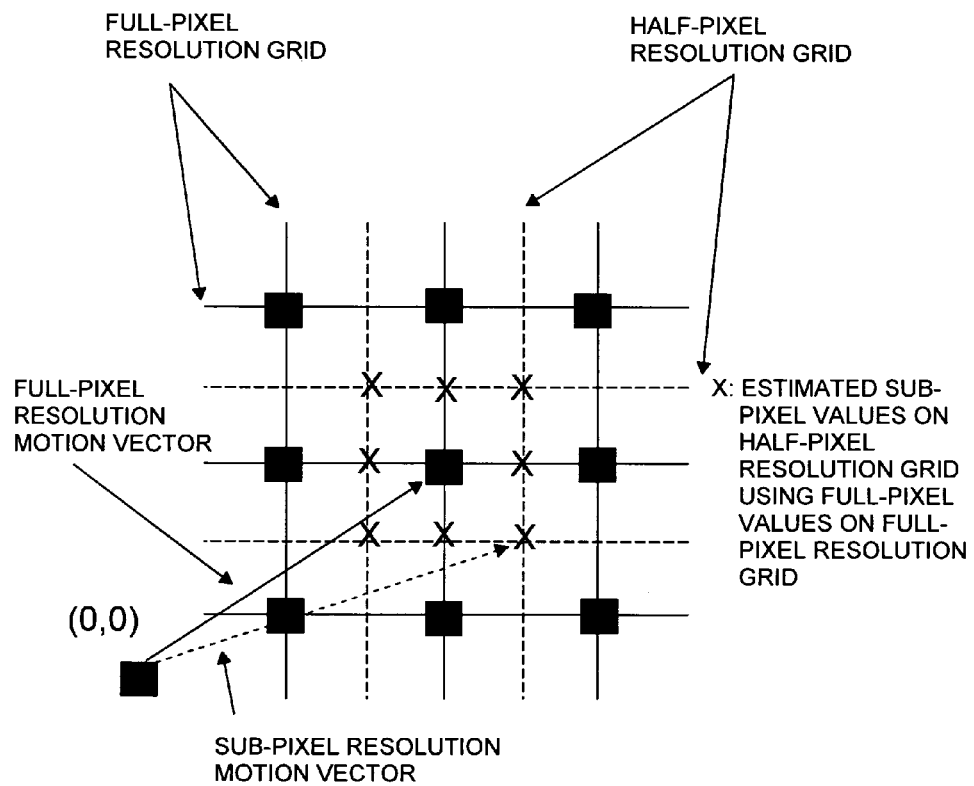
FIG. 5 is a schematic representation illustrating the process of motion estimation to sub-pixel resolution, according to prior art.

Video encoder 700 performs motion compensated prediction on a block-by-block basis and implements motion compensation to sub-pixel resolution as a two-stage process for each block. In the first stage, a motion vector having full-pixel resolution is determined by block-matching, i.e., searching for a block of pixel values in the reference frame $R_n(x,y)$ that matches best with the pixel values of the current image block to be coded. The block matching operation is performed by Motion Field Estimation block 711 in co-operation with Frame Store 717, from which pixel values of the reference frame $R_n(x,y)$ are retrieved. In the second stage of motion compensated prediction, the motion vector determined in the first stage is refined to the desired sub-pixel resolution. To do this, the Motion Field Estimation block 711 forms new search blocks having sub-pixel resolution by interpolating the pixel values of the reference frame $R_n(x,y)$ in the region previously identified as the best match for the image block currently being coded (see FIG. 5). As part of this process, the Motion Field Estimation block 711 determines an optimum interpolation filter for interpolation of the sub-pixel values. Advantageously the coefficient values of the interpolation filter are adapted in connection with the encoding of each image block. In alternative embodiments, the coefficients of the interpolation filter may be adapted less frequently, for example once every frame, or at the beginning of a new video sequence to be coded.

Having interpolated the necessary sub-pixel values and formed new search blocks, Motion Field Estimation block 711 performs a further search in order to determine whether any of the new search blocks represents a better match to the current image block than the best matching block originally identified at full-pixel resolution. In this way Motion Field Estimation block 711 determines whether the motion vector representative of the image block currently being coded should point to a full-pixel or sub-pixel location.

The Motion Field Estimation block 711 outputs the identified motion vector to Motion Field Coding block 712, which approximates the motion vector using a motion model, as previously described. Motion Compensated Prediction block 713 then forms a prediction for the current image block using the approximated motion vector and prediction error information. The prediction is and subsequently coded in Prediction Error Coding block 714. The coded prediction error information for the current image block is then forwarded from Prediction Error Coding block 714 to Multiplexer block 716. Multiplexer block 716 also receives information about the approximated motion vector (in the form of motion coefficients) from Motion Field Coding block 712, as well as information about the optimum interpolation filter used during motion compensated prediction of the current image block from Motion Field Estimation Block 711. According to this embodiment of the present invention, Motion Field Estimation Block 711, based on the computational result computed by the differential coefficient computation block 710, transmits a set of difference values 705 indicative of the difference between the filter coefficients of the optimum interpolation filter for the current block and the coefficients of a predefined base filter 709 stored in the encoder 700. Multiplexer block 716 subsequently forms an encoded bit-stream 703 representative of the image current block by combining the motion information (motion coefficients), prediction error data, filter coefficient difference values and possible control information. Each of the different types of information may be encoded with an entropy coder prior to inclusion in the bit-stream and subsequent transmission to a corresponding decoder.

Figure 8B:
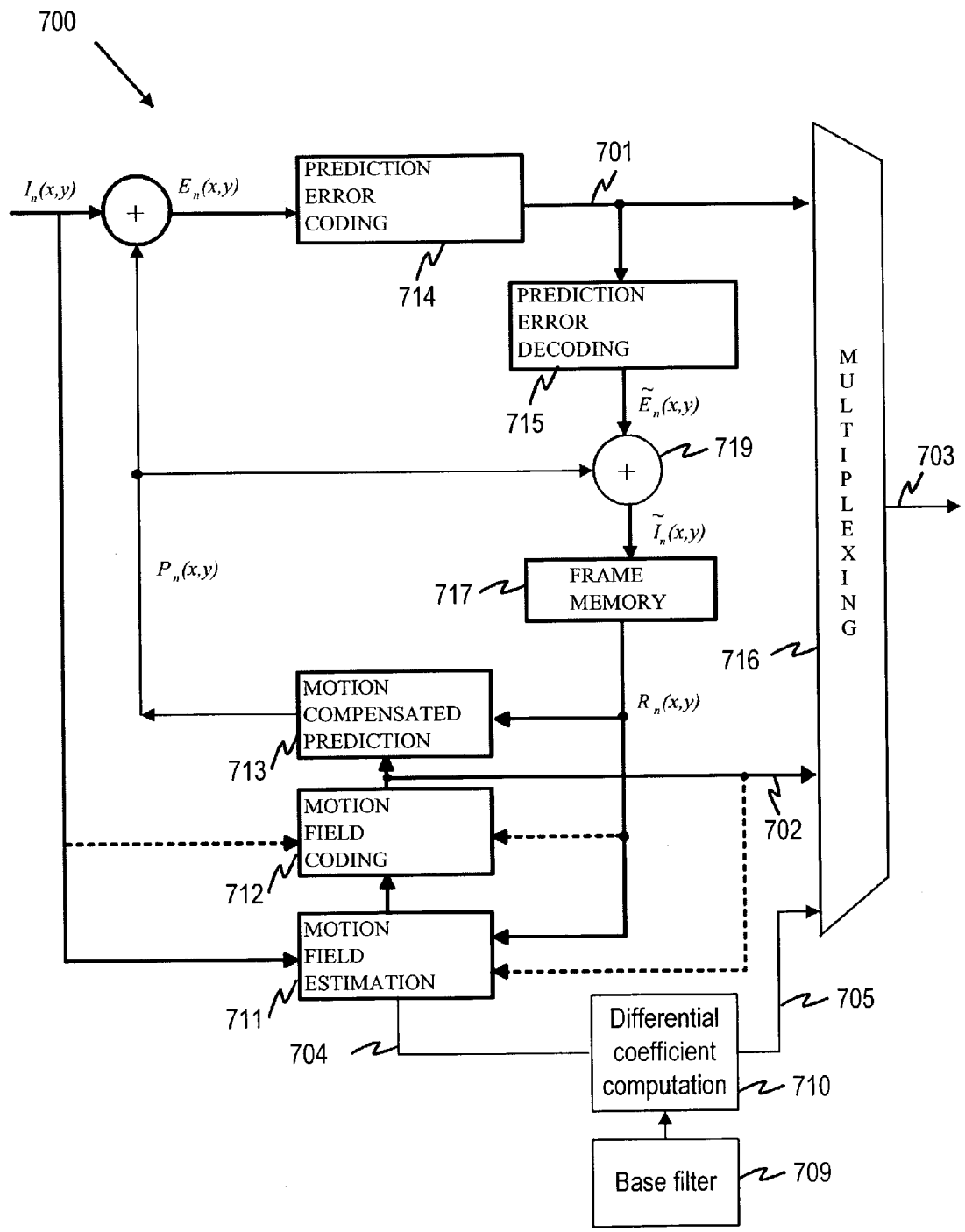
FIG. 8b is a block diagram illustrating a video encoder according to another embodiment of the present invention.

In an alternative embodiment of the invention, the Motion Field Estimation Block 711 sends a set of values 704 indicative of filter coefficients of the optimum interpolation filter to the Differential Coefficient Computation block 710 which is located between the Motion Field Estimation Block 711 and the Multiplexer block 716, as shown in FIG. 8b. Based on the base filter 709, the Differential Coefficient Computation block 710 calculates the difference values 705 and transmits them to the Multiplexer block 716.

Figure 8C:
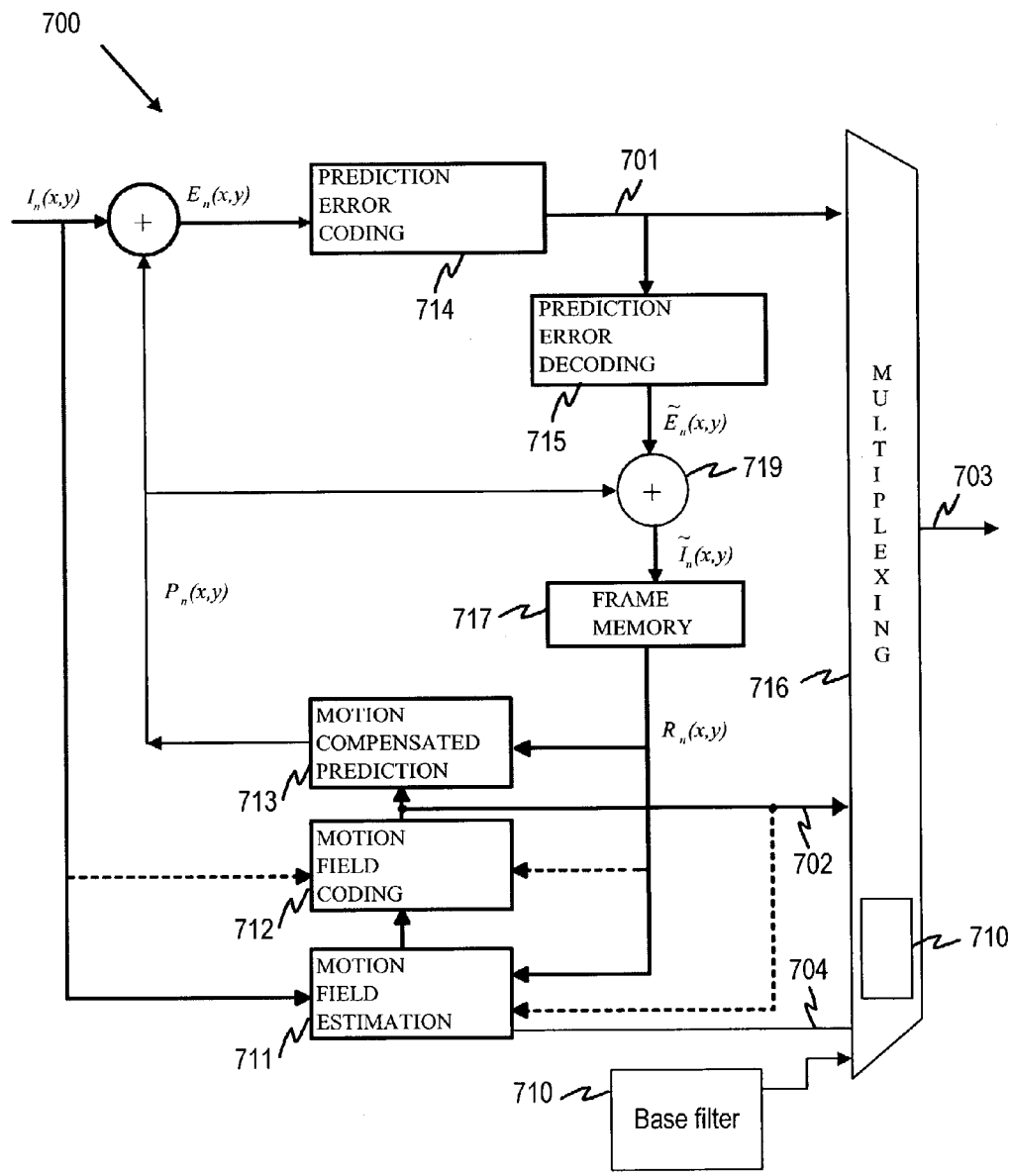
FIG. 8c is a block diagram illustrating a video encoder according to yet another embodiment of the present invention.

In another alternative embodiment, the Differential Coefficient Computation block 710 resides within the Multiplexer block 716. In that case, the filter coefficients 704 of the optimum interpolation filter can be directly sent by the Motion Field Estimation block 711 to the Multiplexer block 716, as shown in FIG. 8c.

Figure 2:
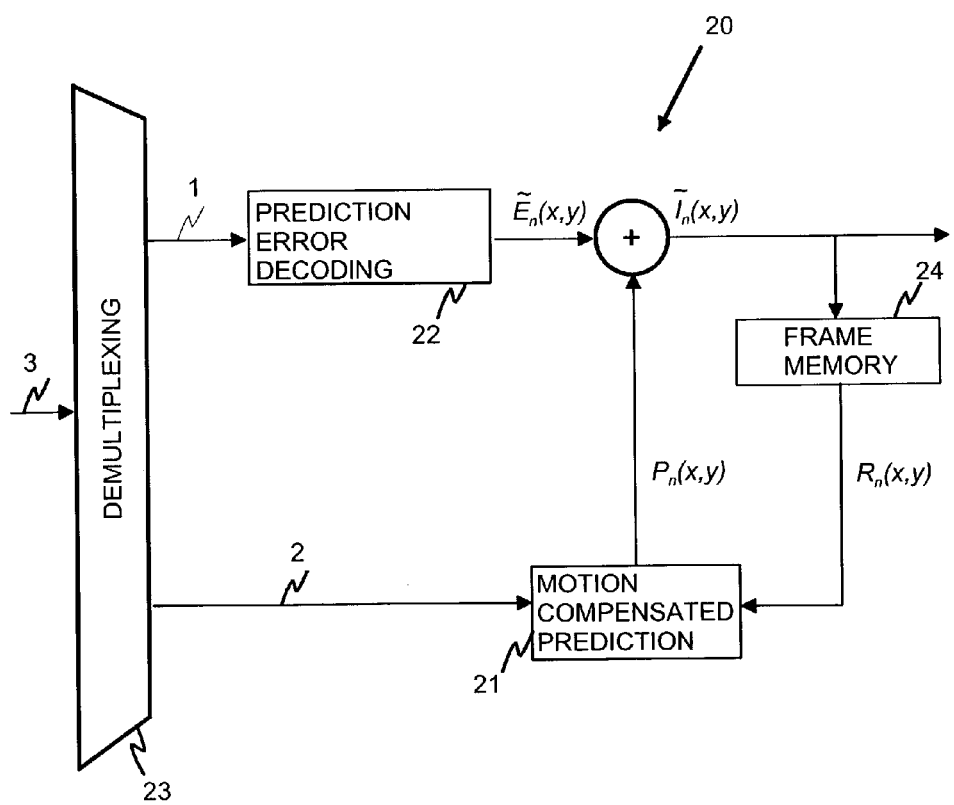
FIG. 2 is a block diagram illustrating a generic video decoder according to prior art.
Figure 3:
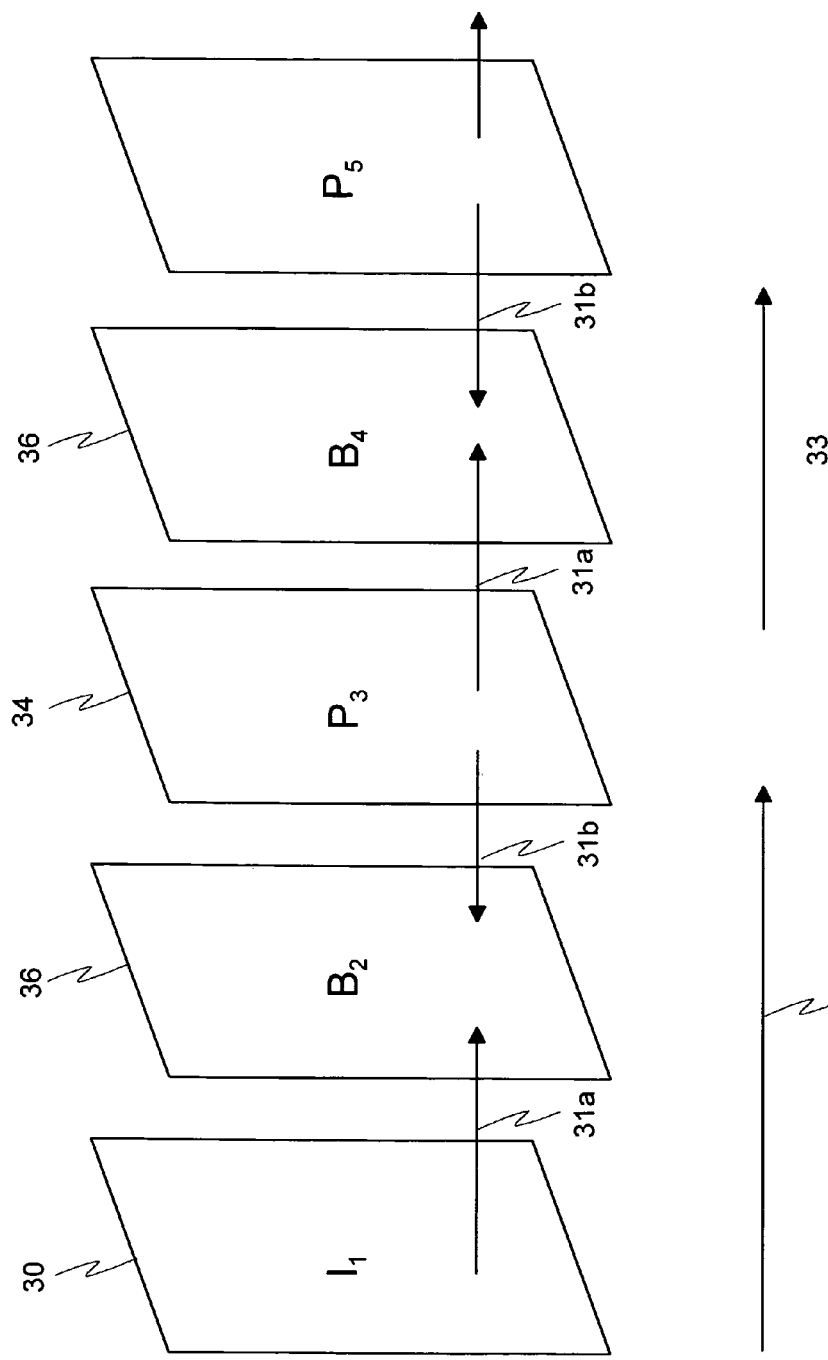
FIG. 3 is a schematic representation illustrating the types of frames used in video encoding.
Figure 4A:
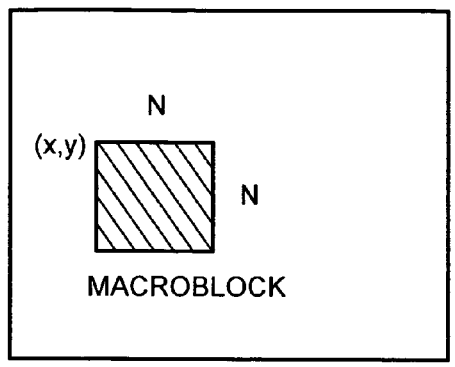
FIG. 4a is a schematic representation illustrating a macroblock in a current frame.
Figure 4B:
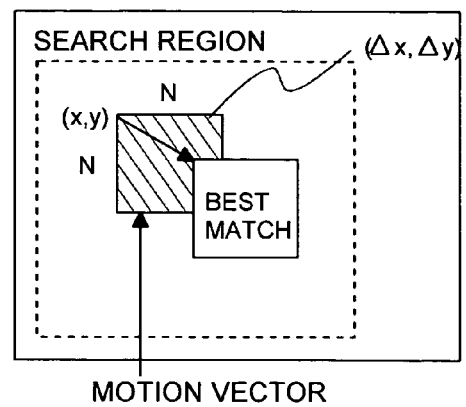
FIG. 4b is a schematic representation illustrating a reference frame for block-matching.
Figure 4C:
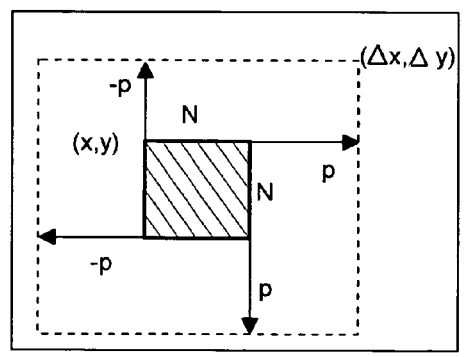
FIG. 4c is a schematic representation illustrating a search region around the original location of the macroblock in the current frame.
Figure 9A:
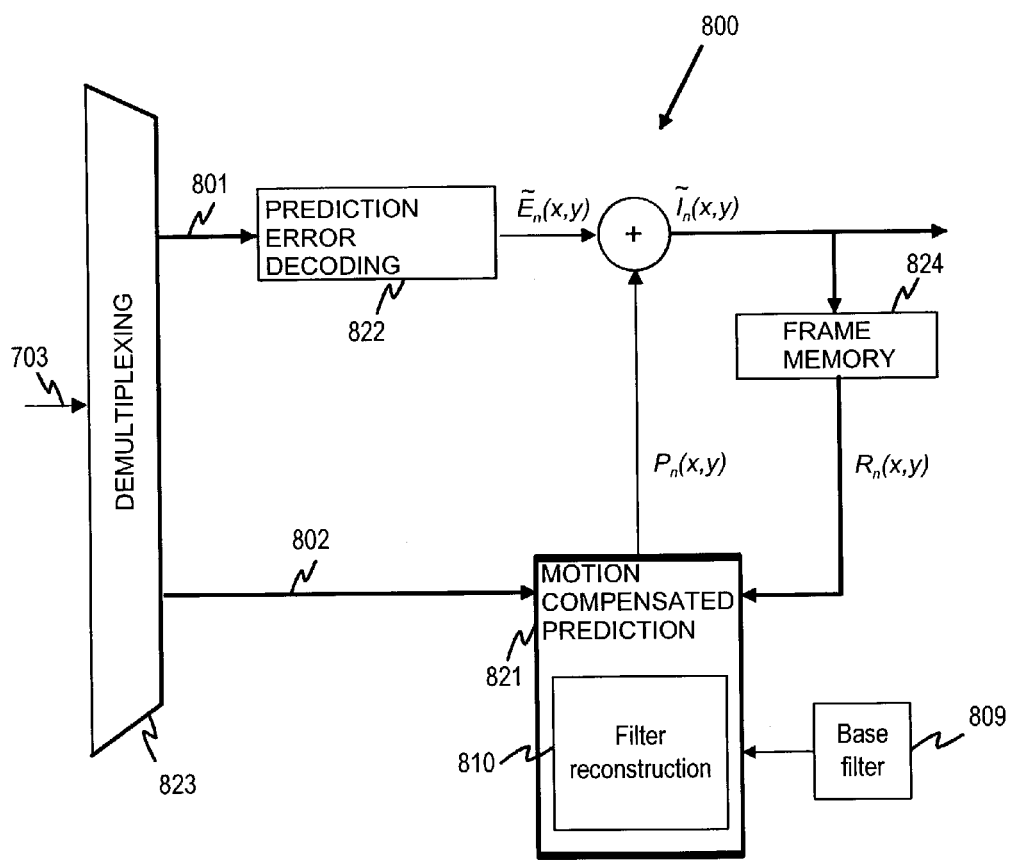
FIG. 9a is a block diagram illustrating a video decoder according to a preferred embodiment of the present invention.

FIG. 9a is a block diagram of a video decoder 800 implemented according to a preferred embodiment of the present invention and corresponding to the video encoder 700 illustrated in FIG. 8a. The decoder 800 comprises a Motion Compensated Prediction block 721, a Prediction Error Decoding block 722, a Demultiplexing block 723 and a Frame Memory 824. Most elements in the decoder 800 function and operate in a manner similar to the corresponding elements in the prior art 20 (see FIG. 2). However, the decoder 800 of the present invention, as shown in FIG. 9a includes a Filter Reconstruction block 810, which reconstructs the optimum interpolation filter 110 (see FIG. 6a) based on the difference values 130 (FIGS. 6b and 6c) and the predefined base filter 809. The predefined base filter 809 is, preferably, identical to base filter 709 (FIGS. 8a-8c).

Operation of the video decoder 800 will now be considered in detail. Demultiplexer 823 receives encoded bit-stream 803, splits the bit-stream into its constituent parts (motion coefficients, prediction error data, filter coefficient difference values and possible control information) and performs any necessary entropy decoding of the various data types. The Demultiplexer 823 forwards prediction error information retrieved from the received bit-stream 803 to Prediction Error Decoding block 822. It also forwards the received motion information to Motion Compensated Prediction block 821. In this embodiment of the present invention, the Demultiplexer 823 forwards the received (and entropy decoded) difference values via signal 802 to the Motion Compensated Prediction block 821 so as to allow the Filter Reconstruction block 810 to reconstruct the optimum interpolation filter 110 (see FIG. 6a) by adding the received difference values to the coefficients of a predefined base filter 809 stored in the decoder. Motion Compensated Prediction block 821 subsequently uses the optimum interpolation filter as defined by the reconstructed coefficient values to construct a prediction for the image block currently being decoded. More specifically, Motion Compensated Prediction block 821 forms a prediction for the current image block by retrieving pixel values of a reference frame $R_n(x,y)$ stored in Frame Memory 824 and interpolating them as necessary according to the received motion information to form any required sub-pixel values. The prediction for the current image block is then combined with the corresponding prediction error data to form a reconstruction of the image block in question.

Figure 9B:
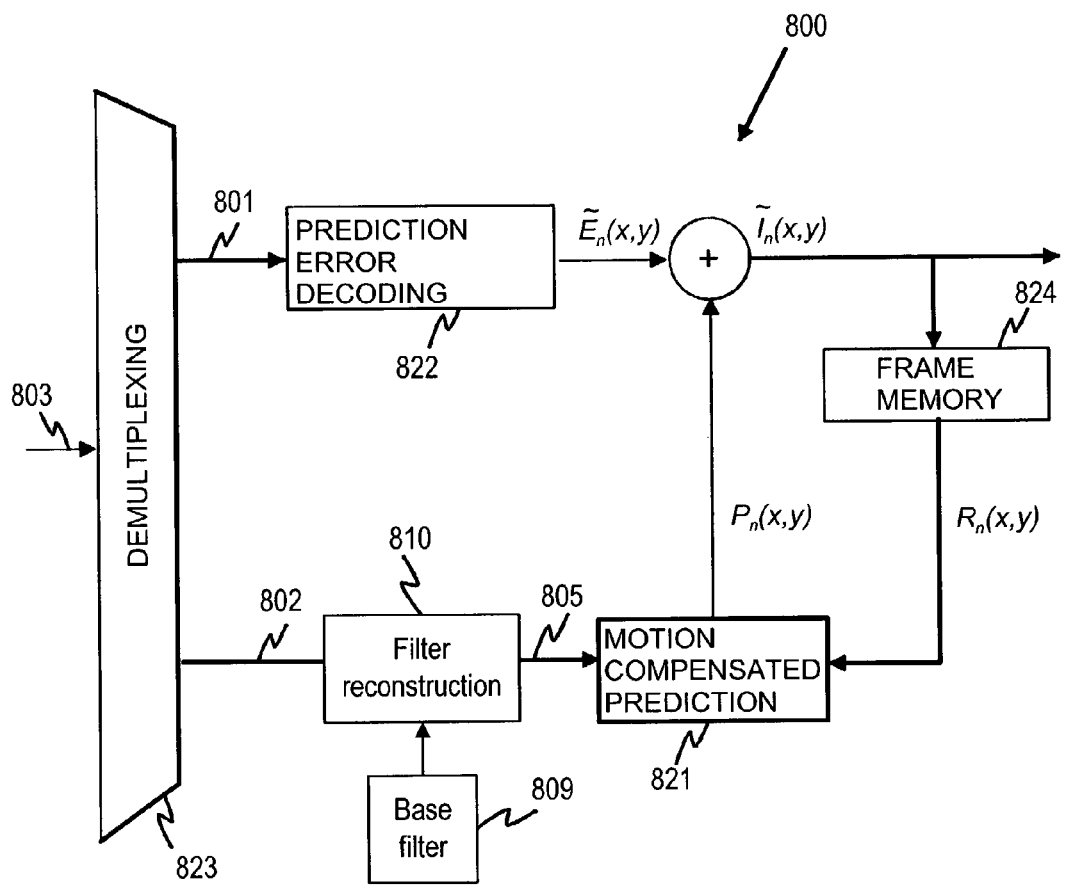
FIG. 9b is a block diagram illustrating a video decoder according to another embodiment of the present invention.
Figure 9C:
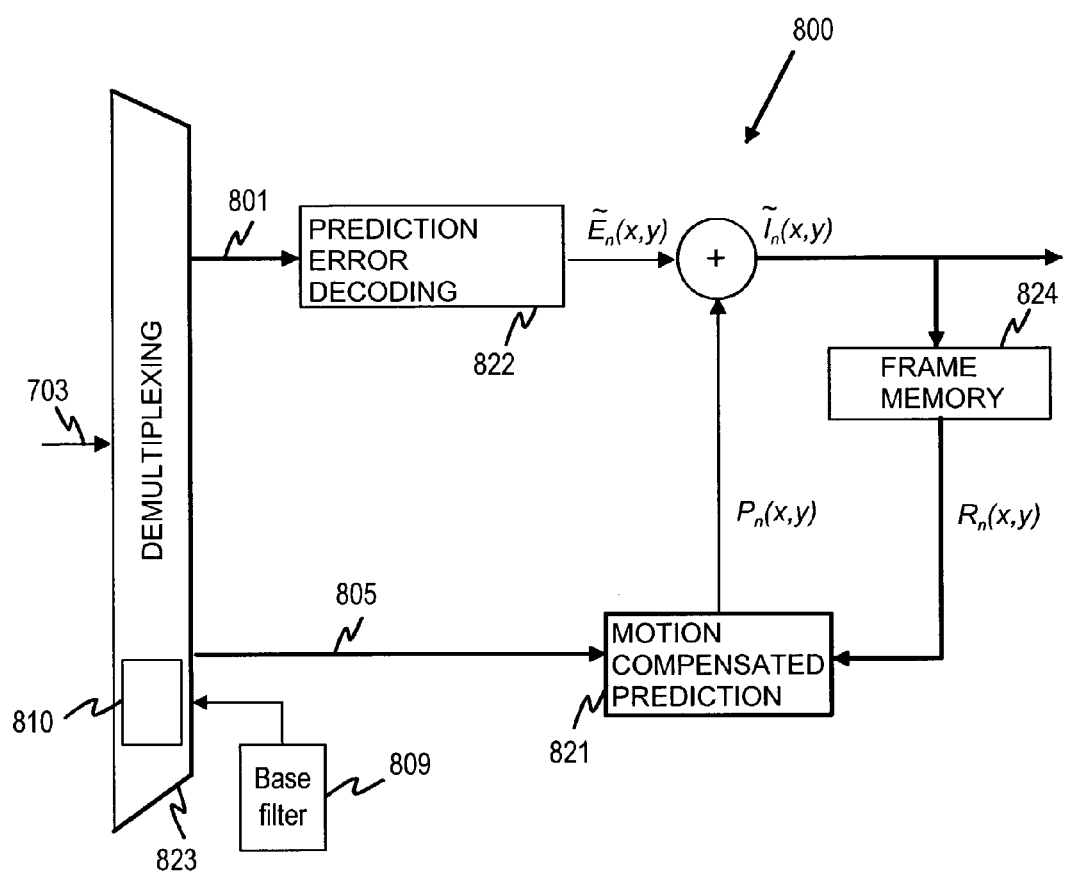
FIG. 9c is a block diagram illustrating a video decoder according to yet another embodiment of the present invention.

Alternatively, the Filter Reconstruction block 810 resides outside of the Motion Compensated Prediction block 821, as shown in FIG. 9b. From the difference values contained in signal 802 received from the Demultiplexer 823, the Filter Reconstruction block 810 reconstructs the optimum interpolation filters and sends the reconstruct filter coefficients 805 to the Motion Compensated Prediction block 821. In yet another alternative embodiment, the Filter Reconstruction block 810 resides in the Demultiplexer block 823. The Demultiplexer block 823 forwards the reconstructed coefficients of the optimum interpolation filter to Motion Compensated Prediction Block 821.

The encoder, according to the present invention, codes filter coefficients differentially with respect to predefined base filter coefficients so as to allow the decoder to reconstruct the optimum interpolation filter based on the difference values. The base filter coefficients should be known to both encoder and decoder and should be statistically reasonably close to the actual filters used in the video sequence to yield good coding performance. In other words, according to the method of the present invention, a base filter having a particular set of coefficient values is defined and then the differences between the base filter coefficients and those of the interpolation filter actually used are coded and included in the video bit-stream. In this way, the amount of information needed to represent the adaptive interpolation filter coefficients in the encoded video bit-stream is reduced with respect to a method in which each of the adaptive filter coefficients is coded separately. If the coefficients of the base filter are sufficiently similar to the coefficients of the interpolation filter actually used, the difference values to be coded are small. Thus, it is advantageous if the predefined base filter is statistically similar to the interpolation filter actually used, as in this case the difference values are reduced and a further improvement in coding efficiency is achieved.

Unlike the differential coding method as proposed in Wedi, the method according to the present invention retains comparatively good error resilience. In the event of an error occurring during transmission of the encoded video bit-stream from encoder to decoder, it is only the difference between the base filter and the interpolation filter actually used that is affected by the error.

It should be noted that the functional elements of the multimedia terminal, video encoder, decoder and video codec according to the present invention can be implemented as software or dedicated hardware, or a combination of the two. The video encoding and decoding methods according to the invention are particularly suited for implementation in the form of a computer program comprising machine-readable instructions for performing the functional steps of the invention. As such, the encoder, decoder and video codec according to the invention may be implemented as a software code stored on a storage medium and executed in a computer, such as a personal desktop computer, in order to provide that computer with video encoding and/or decoding functionality.

Although described in the context of particular embodiments, it will apparent to those skilled in the art that a number of modifications and various changes to these teachings may be made. Thus, while the invention has been particularly shown and described with respect to one or more preferred embodiments thereof, it will be understood by those skilled in the art that certain modifications or changes may be made therein without departing from the scope and spirit of the invention as set forth above.

What is claimed is:

1. A method for encoding an image in a video sequence, said method comprising:
reconstructing sub-pixel values in a reference frame with an interpolation filter having a plurality of coefficient values;
performing prediction of a block to be coded based on the reconstructed sub-pixel values;
coding the coefficient values of the interpolation filter differentially with respect to coefficient values of a base filter for forming a set of difference values, wherein at least one of the coefficient values of the base filter is a non-zero value, and
providing said set of difference values in encoded video data.

2. The method according to claim 1, wherein the image is divided into a plurality of blocks, and the coefficient values of the interpolation filter are adapted during encoding of each image block.

3. The method according to claim 1, wherein the coefficient values of the base filter comprise predefined coefficient values.

4. The method according to claim 1, further comprising:
adapting the coefficient values of the base filter based on statistics of the video sequence.

5. The method according to claim 1, wherein the interpolation filter is symmetrical such that only half the coefficient values of the interpolation filter are coded.

6. The method according to claim 1, wherein the base filter has a plurality of further coefficient values, and wherein a constant value is added to the further coefficient values of the base filter so as to reduce an amplitude of differences between the coefficient values of the interpolation filter and the further coefficient values of the base filter.

7. The method according to claim 1, further comprising:
adapting the coefficient values of the interpolation filter during encoding of each image in the video sequence.

8. An apparatus for encoding a video sequence, said apparatus comprising:
means for defining an interpolation filter for reconstructing sub-pixel values in a reference frame, the interpolation filter having a plurality of coefficient values;
means for performing prediction of a block to be coded based on the reconstructed sub-pixel values;
means for computing a difference between the coefficient values of said interpolation filter and coefficient values of a base filter for providing a set of difference values, wherein at least one of the coefficient values of the base filter is a non-zero value, and
means for providing said set of difference values in encoded video data.

9. The apparatus according to claim 8, further comprising means for entropy coding said set of difference values before providing said set of difference values in the encoded video data.

10. The apparatus according to claim 9, wherein the interpolation filter is symmetrical and the entropy coding means is arranged to encode only half the set of difference values.

11. A method for decoding encoded video data, said method comprising:
retrieving from the encoded video data a set of difference values, said set of difference values indicative of a difference between coefficient values of an interpolation filter and coefficient values of a base filter, wherein at least one of the coefficient values of the base filter is a non-zero value;
constructing the interpolation filter based on said set of difference values and the base filter;
reconstructing the sub-pixel values in a reference frame based on the interpolation filter and the encoded video data; and p2 a prediction of a block to be decoded based on the reconstructed sub-pixel values.

12. The method according to claim 11, wherein the base filter has a plurality of further coefficients represented by a plurality of further coefficient values, said method further comprising summing said set of difference values with the further coefficient values of the base filter for constructing the interpolation filter.

13. The method according to claim 12, wherein said set of difference values is retrieved from the encoded video data by entropy decoding.

14. The method according to claim 11 wherein the coefficient values of the base filter comprises predefined coefficient values for use in decoding of the video sequence.

15. The method according to claim 11, further comprising:

adapting the coefficient values of the interpolation filter during decoding of each image in the video sequence.

16. The method according to claim 11, wherein the image is divided into a plurality of blocks, and wherein said retrieving is performed for each block.

17. The method according to claim 11, further comprising:

adapting the coefficient values of the base filter based on statistics of the video sequence.

18. An apparatus for decoding encoded video data, said apparatus comprising:

means for retrieving a set of difference values from the encoded video data, said set of difference values indicative of a difference between coefficient values of an interpolation filter and coefficient values of a base filter, wherein at least one of the coefficient values of the base filter is a non-zero value;

means for constructing the interpolation filter based on the base filter and said set of difference values;

means for reconstructing sub-pixel values in a reference frame based on the interpolation filter and the encoded video data; and means for performing a prediction of a block to be decoded based on the reconstructed sub-pixel values.

19. The apparatus according to claim 18, wherein the base filter has a plurality of further coefficients represented by further coefficient values, said apparatus further comprising means for summing said set of difference values with the further coefficient values of the base filter for constructing the interpolation filter.

20. The apparatus according to claim 18, further comprising means for entropy decoding said set of difference values from the bit-stream.

21. A video coding system comprising:

an encoder for encoding a video sequence, the encoder configured for defining an interpolation filter for reconstructing sub-pixel values in a reference frame wherein the interpolation filter comprises a plurality of coefficients values, and a decoder for decoding the encoded video data, wherein the encoder further comprises:

a computation module for computing a difference between the coefficient values of the interpolation filter and coefficient values of a base filter for providing a set of difference values, wherein at least one of the coefficient values of the base filter is a non-zero value, and a multiplexing module for providing said set of difference values in the encoded video data; and wherein the decoder comprises:

a demultiplexing module for retrieving said set of difference values from the encoded video data;

a computation module for constructing the interpolation filter based on the base filter and said set of difference values;

an interpolation module for reconstructing the sub-pixel values in a reference frame based on the interpolation filter and the encoded video data, and a prediction module for performing a prediction of a block to be decoded based on the reconstructed sub-pixel values.

22. A video encoder apparatus for encoding an image in a video sequence, the apparatus configured to define an interpolation filter for reconstructing sub-pixel values in a reference frame, wherein the interpolation filter comprises a plurality of coefficient values, said apparatus comprising:

a prediction module for performing a prediction of a block to be coded based on the reconstructed sub-pixel values;

a computation module for computing a difference between the coefficient values of said interpolation filter and coefficient values of a base filter for providing a set of difference values, wherein at least one of the coefficient values of the base filter is a non-zero value, and a multiplexing module configured for providing said set of difference values in an encoded video data.

23. The apparatus according to claim 22, further comprising a coding module for entropy coding said set of difference values before providing said set of difference values in the encoded video data.

24. The apparatus according to claim 22, wherein the coefficient values of the interpolation filter are adapted during encoding of each image in the video sequence.

25. The apparatus according to claim 22, wherein the image is divided into a plurality of blocks, and the coefficient values of the interpolation filter are adapted during encoding of each image block.

26. The apparatus according to claim 22, wherein the coefficient values of the base filter comprise predefined coefficient values for use in encoding of the video sequence.

27. The apparatus according to claim 22, wherein the coefficient values of the base filter are adapted based on statistics of the video sequence.

28. An apparatus for decoding encoded video data, said video decoder comprising:

a demultiplexing module configured for retrieving a set of difference values from the encoded video data;

a filter construction module for constructing an interpolation filter based on a base filter and said set of difference values, wherein the base filter comprises a plurality of coefficient values, and at least one of coefficient values is a non-zero value;

an interpolation module for reconstructing sub-pixel values in a reference frame based on the interpolation filter and the encoded video data, and a prediction module for performing a prediction of a block to be decoded based on the reconstructed sub-pixel values.

29. The apparatus according to claim 28, wherein the base filter has a plurality of further coefficients represented by further coefficient values, said video decoder further comprising a summing module for summing said set of difference values with the further coefficient values of the base filter for constructing the interpolation filter.

30. The apparatus according to claim 28, wherein the coefficient values of the base filter comprise predefined coefficient values for use in decoding of the video sequence.

31. The apparatus according to claim 28, wherein the coefficient values of the interpolation filter are adapted during decoding of each image in the video sequence.

32. The apparatus according to claim 28, wherein the video image is divided into a plurality of blocks, and said retrieving is performed for each block.

33. The apparatus according to claim 28, wherein the coefficient values of the base filter are adapted based on statistics of the video sequence.

34. A computer readable medium embedded with a computer program having programming codes to perform a method for encoding images in a video sequence, said method comprising:
- reconstructing sub-pixel values in a reference frame with an interpolation filter having a plurality of coefficient values;
- performing prediction of a block to be coded based on the reconstructed sub-pixel values;
- computing a difference between the coefficient values of said interpolation filter and coefficient values of a base filter for providing a set of difference values, wherein at least one of the coefficient values of the base filter is a non-zero value, and
- providing said set of difference values in encoded video data.

35. The computer readable medium of claim 34, wherein said method further composes:
- entropy coding said set of difference values before providing said set of difference values in the encoded video data.

36. A computer readable medium embedded with a computer program having programming codes to perform a method for decoding encoded video data, said method comprising:
- retrieving from the encoded video data a set of difference values;
- reconstructing an interpolation filter based on coefficient values of a base filter and said set of difference values, wherein at least one of the coefficient values of the base filter is a non-zero value;
- reconstructing sub-pixel values in a reference frame based on the reconstructed interpolation filter and the encoded video data and
- performing a prediction of a block to be decoded based on the reconstructed sub-pixel values.

37. The computer readable medium of claim 36, wherein said method further comprises:
- entropy decoding said set of difference values.

* * * * *

UNITED STATES PATENT AND TRADEMARK OFFICE
CERTIFICATE OF CORRECTION

PATENT NO. : 7,379,501 B2 Page 1 of 1
APPLICATION NO. : 10/342439
DATED : May 27, 2008
INVENTOR(S) : Jani Lainema It is certified that error appears in the above-identified patent and that said Letters Patent is hereby corrected as shown below:

In column 20, line 44, claim 8, after "in" --an-- should be inserted.

In column 20, line 66, claim 11, "p2" should be --performing--.

In column 22, line 38, claim 26, "predefmed" should be --predefined--.

In column 24, line 2, claim 35, "composes" should be --comprises--.

Signed and Sealed this

Twelfth Day of August, 2008

JON W. DUDAS
*Director of the United States Patent and Trademark Office*